W. R. MITTENDORF.
DISPENSING MACHINE.
APPLICATION FILED SEPT. 2, 1909. RENEWED DEC. 30, 1912.

1,068,153.

Patented July 22, 1913.

5 SHEETS—SHEET 2.

W. R. MITTENDORF.
DISPENSING MACHINE.
APPLICATION FILED SEPT. 2, 1909. RENEWED DEC. 30, 1912.
1,068,153.
Patented July 22, 1913.
5 SHEETS—SHEET 3.
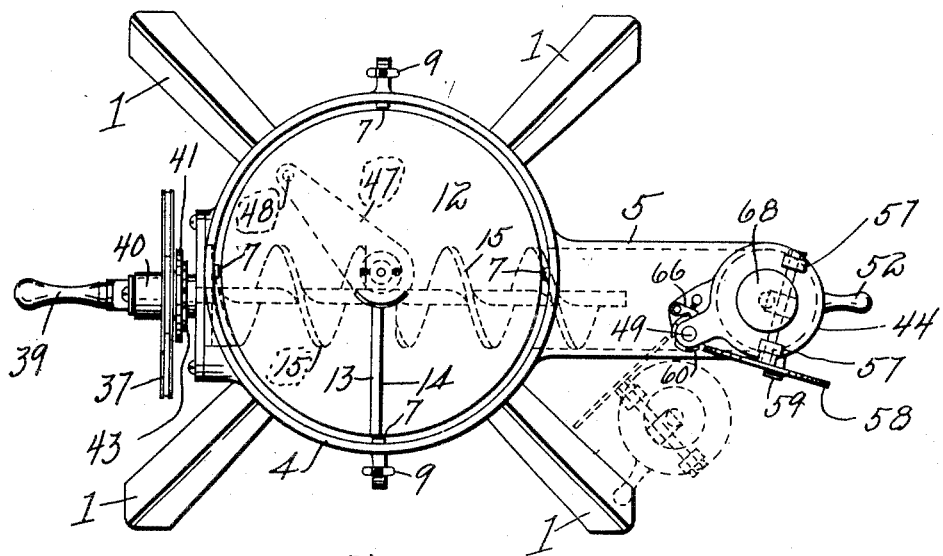
Fig. 3.
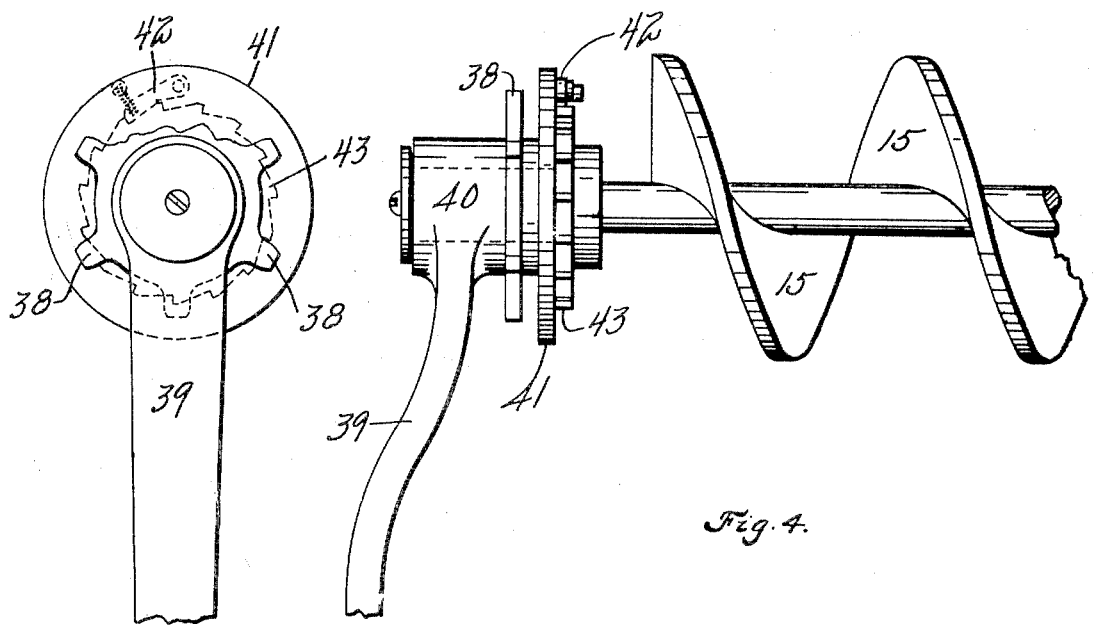
Fig. 4a.
Fig. 4.
Wm. R. Mittendorf,
Inventor
Witnesses
C. M. Theobald
M. Siebler
By R. J. McCarty,
his Attorney

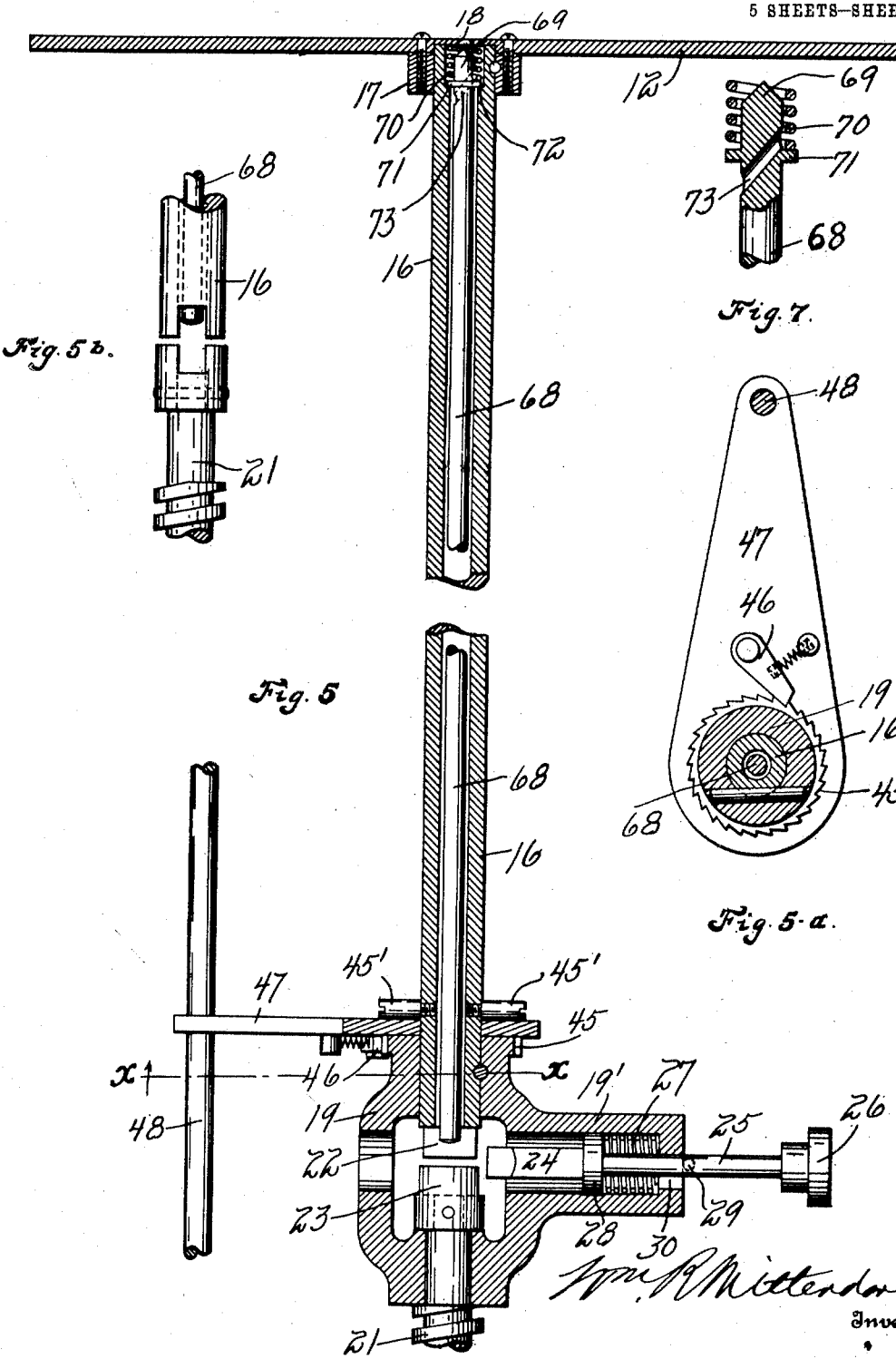

W. R. MITTENDORF.
DISPENSING MACHINE.
APPLICATION FILED SEPT. 2, 1909. RENEWED DEC. 30, 1912.
1,068,153.
Patented July 22, 1913.
5 SHEETS—SHEET 5.
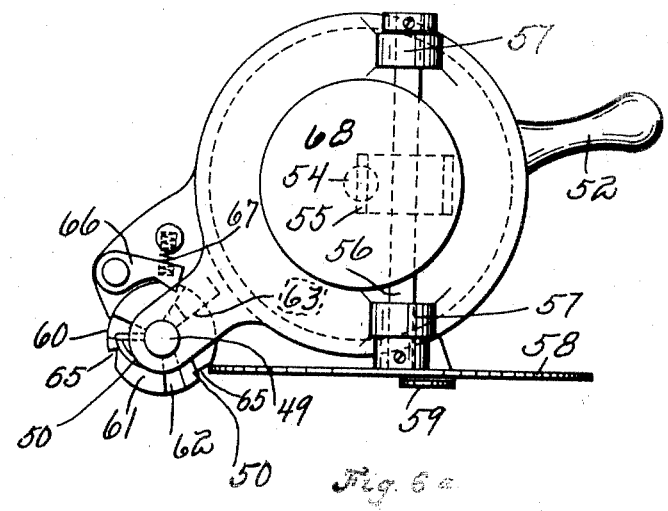
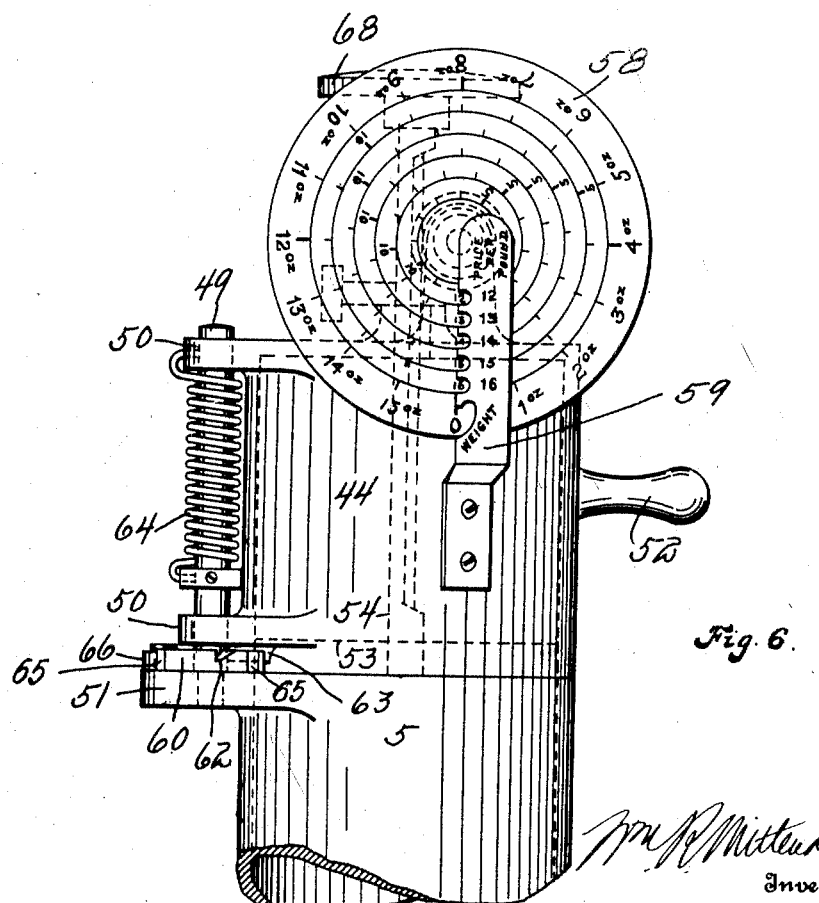

UNITED STATES PATENT OFFICE.

WILLIAM R. MITTENDORF, OF DAYTON, OHIO.

DISPENSING-MACHINE.

1,068,153.   Specification of Letters Patent.   Patented July 22, 1913.

Application filed September 2, 1909, Serial No. 515,963. Renewed December 30, 1912. Serial No. 739,376.

*To all whom it may concern:*

Be it known that I, WILLIAM R. MITTENDORF, a citizen of the United States, residing at Dayton, in the county of Montgomery and State of Ohio, have invented certain new and useful Improvements in Dispensing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention comprises certain improvements and means for dispensing lard in retail quantities from the cans in which it is packed at the packing houses.

The object of the invention is to provide a machine which is adapted to effectually discharge the lard from the can without damaging the can, and to measure the quantities thus discharged and ascertain the cost thereof.

The invention enables the handling of the lard from the original can to the package in which it is delivered to the purchaser without soiling the hands or clothing of the operator.

It is a well-known fact that the present manner or method of dispensing lard in retail groceries by means of a paddle is attended with more or less loss to the grocery-man or purchaser, owing to over weight on the one hand or short weight on the other hand, it being well-nigh impossible to give exact weight by this method of selling lard; this is especially true when the clerks are busy waiting on customers in a crowded condition of business. The present invention removes this difficulty and insures accuracy in both weight and price, as well as cleanliness in handling the commodity.

A further advantage of the present invention is due to the sanitary nature of the apparatus, the lard being thoroughly protected from the air and dust at all times after the can has been placed in the machine.

Preceding a detailed description of the invention, reference is made to the accompanying drawings, of which—

Figure 1:
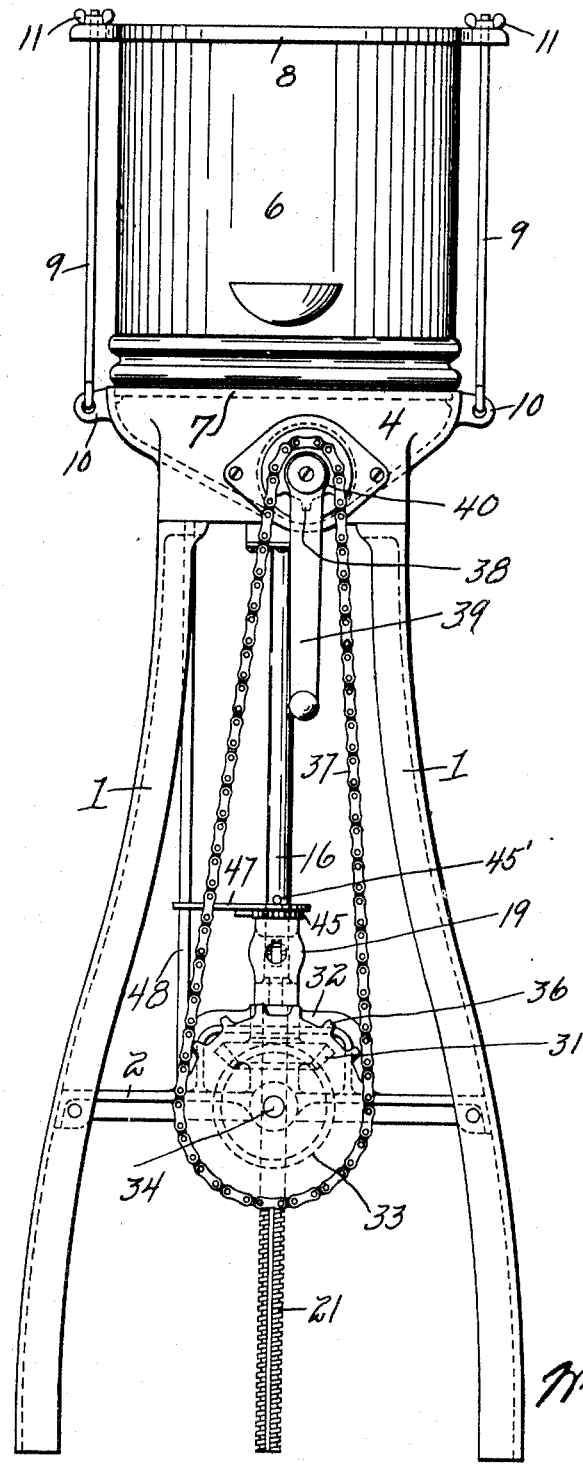
Figure 2:
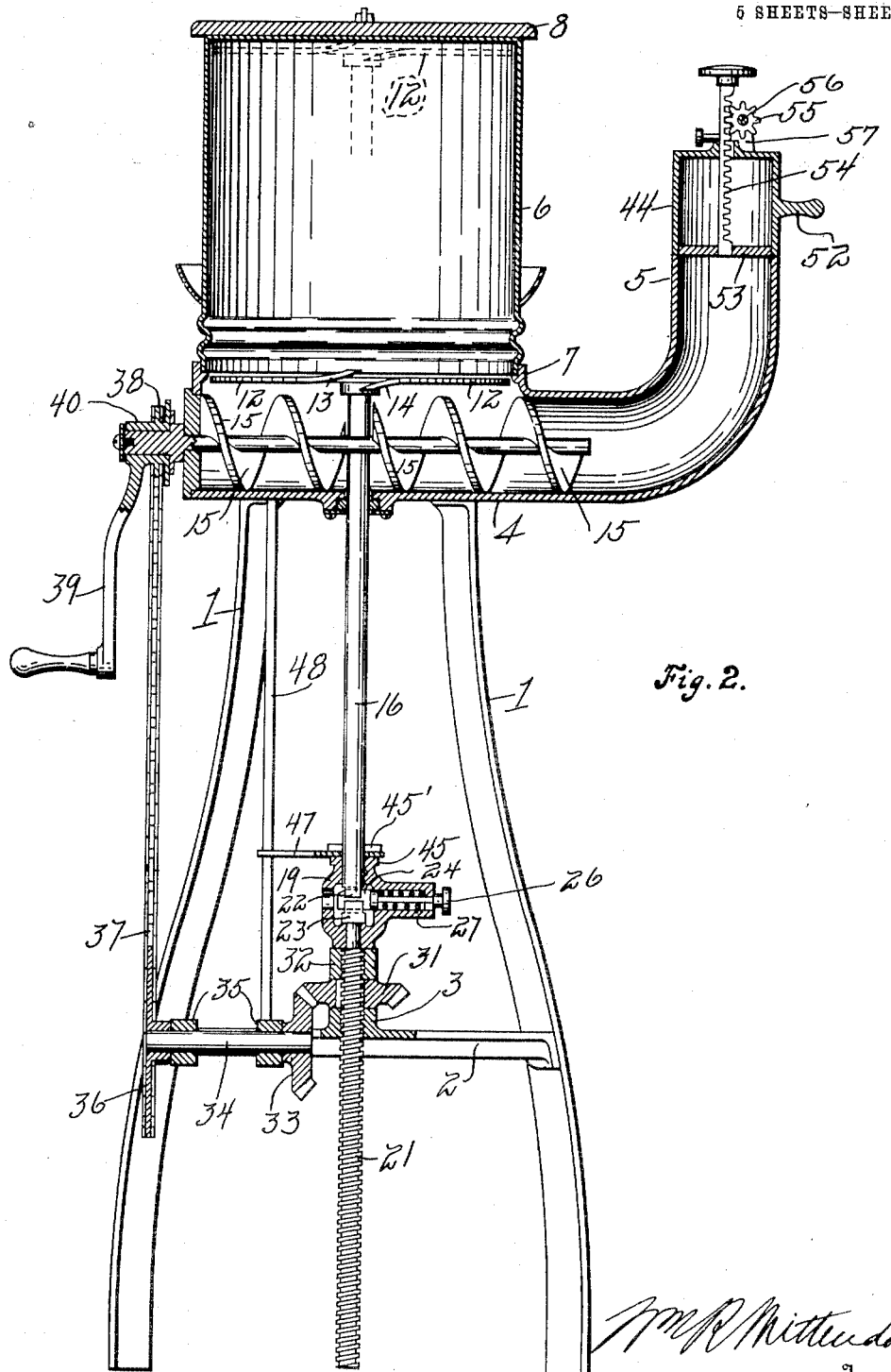

Figure 1, is a front elevation of the machine with a can of lard in position thereon. Fig. 2, is a vertical section at right angles to Fig. 1, the same being on a median line. Fig. 3, is a top plan view, the can of lard being removed. Fig. 4, is a detail view enlarged, of the conveyer and driving devices therefor. Fig. 4ª, is an elevation of Fig. 4. Fig. 5, is a longitudinal vertical sectional view of the mechanism for feeding the lard from the can to the conveyer, shown in Figs. 2 and 4. Fig. 5ª is a sectional view on the line *x—x* of Fig. 5. Fig. 5ᵇ, is a detail view of the clutch portion of the shafts shown in Fig. 5 at a right angle to Fig. 5. Fig. 6, is an enlarged detail view of the upper end of the discharge spout with the delivery cap and computing devices. Fig. 6ª, is a top plan view of Fig. 6. Fig. 7, is a detail sectional view of the upper end of the valve rod.

In a detailed description of the invention, similar reference characters indicate corresponding parts.

The frame-work of the machine may be more or less varied from the construction shown in the drawings, which consists of four standards 1 connected at their lower portions by a cross frame 2 having a central hub or boss 3 provided with a screw-threaded aperture. Supported upon the frame-work thus formed by said standards, is a conveyer housing 4 which extends in an upturned discharge spout 5 in a suitable curvature. The portion of the housing 4 above the standards or frame-work of the machine is circular in form and is open at the top to receive the lard can 6 which is placed therein in an inverted position after the lid or cover of the can has been removed. The can 6 so placed is supported upon lugs 7 on the interior of the housing 4 and immediately at the entrance of the opening in said housing. When the can is thus placed, the lard is exposed, but the rim of the housing which surrounds the mouth of the can acts as a cover to protect the lard from dust or exposure to the surrounding air. The can thus placed in position, is held firmly by means of a plate 8 which engages the bottom of the can and is clamped firmly against the can by means of tie rods 9 which extend from ears 10 projecting from opposite sides of the housing 4 and passing through openings in opposite portions of the plate 8 where said rods receive thumb screws 11 above the plate 8 by means of which said plate is securely clamped against the bottom of the can to hold the same rigidly in position as shown in Fig. 1. When the can is in this position, the lard is removed therefrom by a pressure plate or disk 12, which is of a diameter sufficiently less than the diameter of the lard can to enable said plate to move through the length of said can. This pressure plate is cut or slit from the axis thereof to the periphery on one side to provide upwardly and downwardly extended tongues 13 and 14 which extend from the periphery to the axis or approximately to the axis of said plate, and whereby said plate is enabled to pass up through the lard to the bottom of the can, from which position the lard is forced downwardly from the mouth of the can to the spiral conveyer 15 which lies across the interior of the housing 4, and to which further reference will be made. The tongues or edges 13 and 14 cut into the lard as the plate 12 is rotated and elevated.

The pressure plate or disk 12 is rigidly connected to the upper end of a hollow shaft 16, which connection may be varied from that shown in the drawings, which consists in uniting said disk or plate to a collar 17 which surrounds the upper end of the hollow shaft 16 and is rigidly secured thereto by means of a key. The axis of the plate or disk 12 has a valve seat or opening 18 therein which will be again referred to in connection with other devices which are instrumental in relieving the vacuum or partial vacuum formed between the upper side of the pressure plate 12 and the interior side of the bottom of the can. The lower end of the hollow driving shaft 16 extends into an apertured head 19 and is rigidly connected thereto, and coöperating with the said shaft 16, is a screw 21 which also extends into the head 19 from below and in alinement with said shaft 16 as clearly shown in Fig. 5, but is not rigidly connected to said head. The shaft 16 and the screw 21 are provided with clutch members 22 and 23 on their adjacent ends, the former member being on the lower end of the hollow shaft 16, and member 23 being on the upper end of the screw 21. The recess provided in this manner between the adjacent ends of the shaft and screw is clearly shown in Fig. 5ᵇ, and it is adapted to receive a key 24 to lock the two shafts together to cause them to rotate in unison or to enable their disengagement as in Fig. 5. The key 24 is shaped to enter said recess and is on the innermost end of a bolt 25 which is provided with a finger-piece 26 for manipulation. The apertured head 19 is provided with a hollow lateral extension 19′ within which the key 24 and its supporting bolt 25 lie. A spring 27 surrounds the bolt and is inclosed between a collar 28 on the bolt and the end of said extension 19′. The key is held out of engagement with the clutch members 22 and 23 by means of a pin 29 extending across the bolt 25 as shown in dotted lines in Fig. 5. In order to permit said key to enter between said clutch members 22 and 23 the bolt 25 is turned to bring said pin 29 in a position to enter the opening 30 in the end of the extension 19′, at which time the expanding effect of the spring 27 will cause the key 24 to engage the clutch members to lock the shaft 16 and screw 21, and to maintain it in such position. It will be understood that when the shaft 16 and screw 21 are thus clutched or connected, the apertured head 19 and said shaft and screw will rotate together. The screw passes through the screw-threaded axial boss 3 of the cross frame 2 hereinbefore referred to, and is fitted with a miter gear 31 which lies below a screw-threaded collar 32 surrounding said shaft and itself supporting the head 19, see Fig. 2. Engaging the miter gear 31, is a similar gear 33 on shaft 34 provided with bearings 35 on the cross frame 2. The shaft 34 is driven from a chain wheel 36 which in turn, is driven from a chain 37 extending down from a chain wheel 38 which is driven from the crank 39 which drives the spiral conveyer 15. The shaft of the spiral conveyer 15 extends out of the conveyer housing 4 and receives the apertured boss 40 of said crank which is loose on said shaft. The chain wheel 38 is rigid on said boss 40 as is also a disk 41 which carries a ratchet pawl 42 engaging a ratchet wheel 43 which is rigid on the shaft of the spiral conveyer, see Fig. 4. It will be seen that when the crank 39 is rotated, in one direction, the spiral conveyer 15 will be driven through the pawl 42 and ratchet wheel 43, and the screw 21 will at the same time be driven through the gears 31 and 32, but said conveyer will not be driven when the crank is rotated in the opposite direction. This independent movement of the crank enables reverse movement to be imparted to the screw 21 and shaft 16 supporting the pressure plate 12. Such movement of the shaft 16 is instrumental in rotating the pressure plate 12 up through the body of the lard within the can to a position where said plate will be above the lard and may force the lard downwardly when the spiral conveyer 15 is rotated, and the plate 12 at the same time lowered. In Fig. 2, the plate 12 is shown in dotted lines at the top of the can, and when in this position, the machine is ready to discharge the lard to the spiral conveyer 15 and from the spiral conveyer to the delivery cap 44 which is arranged above the discharge spout 5 as hereinafter more fully described.

It will be understood that the oppositely-turned tongues 13 and 14 of the pressure plate 12, are essential in that they enable the said plate to cut through the lard and ascend to the bottom of the can in a manner that it is believed will be readily understood. As the said plate is rotated and is driven upwardly, the lard is forced down through the opening between the tongues 13 and 14 below said plate, the positions of the tongues being such that they have a continuous progressive contact with the lard throughout the combined rising and rotating movements of said plate. It will be understood that when the said plate is lowered to force the lard out of the can, it is not given a rotary movement; this operation will be further referred to. The upper end of the apertured head 19 has a ratchet wheel 45 which may be integral therewith. Engaging this ratchet wheel, is a pawl 46 which rides freely over said ratchet wheel when the shaft 16 is being rotated from the screw 21 to elevate the pressure plate 12, and prevents a reverse rotary movement of said shaft 16 and the apertured head 19 when the pressure plate 12 is being lowered. The connection of the screw 21 with the apertured head 19 is loose as hereinbefore stated, and is in the nature of a swivel, but even when the screw and the shaft 16 are disconnected, there is some possibility of the shaft 16 turning because of the unavoidable friction between the head 19 and the connected end of the screw. The ratchet devices above described are therefore provided to overcome such contingency.

As shown in Figs. 5 and 5ª, the ratchet pawl 46 is mounted upon an arm 47, the inner end of which has an aperture through which the shaft 16 passes, and which end lies above the ratchet wheel 45; screws 45' enter opposite sides of the shaft 16 and serve to hold said arm from rising independently of the head 19. The outer end of said arm 47 is provided with an aperture through which a vertical holding rod 48 passes, one end of which is connected to the cross frame 2, and the other end of which is connected to a housing 4, and thus the said arm 45 is prevented from rotating with the head.

I have heretofore referred to the vacuum created above the pressure plate 12 within the lard can, and the necessity of relieving the same in order that the said pressure plate may be lowered to discharge the lard to the spiral conveyer 15. The means provided for this purpose consists of a rod 68 loosely telescoped within the pressure plate shaft 16 and provided with a valve end 69 on its upper extreme end which coöperates with the valve opening 18 in the axis of the pressure plate 12 hereinbefore referred to, see Fig. 7. When the clutch key 24 is inserted between the clutch members 22 and 23 of the shaft 16 and screw 21 to connect said shaft and screw, the said key elevates the valve rod 68 into the opening 18 and against the tension of a helical spring 70 which surrounds the upper end of said valve rod and is inclosed between the pressure plate 12 and a collar 71 which is fixed to the upper end of said rod. The said collar 71 engages a shoulder 72 formed on the interior of the shaft 16, and the valve rod is thus maintained in an operative position. It will be understood that the valve end of the rod closes the opening 18 only when the key 24 is inserted, and this takes place only when the pressure plate 12 is being driven through the lard to the bottom of the can. When the said plate is so elevated, the key 24 is withdrawn and the valve rod 68 is lowered by the spring 70, to enable the air to pass up to above the pressure plate. A channel or air port 73 is provided in the valve rod to permit the air to pass above the collar 71 and up through the valve opening in the pressure plate 12.

The delivery cap 44 briefly referred to, is hinged to the upper end of the discharge spout 5 by means of a hinge pin 49 which passes through apertured bosses 50 extending from the side of said cap, and into a boss 51 extending laterally from the upper end of said discharge spout, see Fig. 6. A handle 52 projecting from said delivery cap affords convenient means for moving it upon its hinge to the position shown in dotted lines in Fig. 3, which is away from the discharge spout, and in which position the contents fed into said cap may be delivered therefrom to the package or receptacle in which it is to be delivered from the machine. Within the said delivery cap, there is a plate or piston 53 which is movable the length of said cap and has connected to it a rack 54 which passes through the top of the cap and engages a pinion 55 on a shaft 56 journaled in bosses 57 extended from the top of said cap. On one end of this shaft 56 is rigidly secured a computing dial 58, having a series of concentric rows of figures, the outermost row of which may indicate the weight in ounces, and the inner row of which may indicate the values of the quantities of lard dispensed up to and including the price of one pound. Rigidly secured to the side of the delivery cap and coöperating with the weight and value-computing dial 58, is a price per pound indicator in the form of an upright bar 59 upon which is inscribed the various prices per pound, and an edge of which is provided with a series of reading openings through which the value figures on the dial are read in connection with the various prices per pound. If the lard is selling at twelve cents per pound, the innermost concentric row of figures is read in connection with that pound price on the indicator 59, and it will be understood that if the lard is selling at sixteen cents per pound, the row of figures adjacent to the outermost row is read in connection with that indication on the indicator 59. As shown in Fig. 2, the piston or plate 53 is shown at the mouth of the delivery cap 44 and at the upper end of the discharge spout 5. It will therefore, be understood that as the lard is forced up through said discharge spout by the conveyer 15, it will elevate said piston or plate 53 to the extent of the amount of lard delivered to said cap, and such movement of said piston 53 will likewise impart movement to the computing dial 58 through the rack 54, pinion 55 and shaft 56. The operation of this computing device is substantially the same as that shown and described in my former Patent No. 899,124 of September 22, 1908.

In order that the delivery cap may be returned to its normal position above the discharge spout 5, after each operation of emptying said delivery cap, in a manner that will not scrape any of the lard from the top of said discharge spout, I have provided means for slightly elevating said delivery cap in its return movement from the position shown in dotted lines in Fig. 3, to the position shown in full lines. Such means consist of a member 60 which is supported upon the boss 51 extending from the discharge spout 5 and pivoted upon the lower end of the hinge pin 49. This member 60 has a series of upper surfaces 61 and a corresponding number of lower surfaces 62, see Figs. 6 and 6$^a$. On the lower side of the lower hinge boss 50 of the delivery cap, is a lug 63, which, when said delivery cap is in engagement with the upper end of the discharge spout 5, lies within one of the lower surfaces or recesses 62, and when said lug rides out of said recess, (which occurs when the delivery cap is being returned to its position above the discharge spout 5) said cap is elevated by said lug riding onto the upper adjacent higher surface 61. In the return movement of the delivery cap, the cam member 60 is prevented from turning by means of a pawl 66 which may engage any one of three recesses 65 on the periphery of said member 60, said pawl being pressed into said recesses 65 by a spring 67. When the said cap arrives in alinement with the discharge spout, it engages the same, owing to the lug 63 entering one of the cam depressions 62. It will be understood that in swinging the delivery cap to the outer position, the cam member 60 is rotated, the pawl 66 riding out of the recess 65 which it previously engaged. The upper end of the rack bar 54 is provided with a knob 68 which may be pressed by the hand in discharging the contents of said cap into the package or receptacle in which it is delivered to the purchaser.

The operation of the machine may be briefly described as follows: As shown in Fig. 2, a can of lard is in position, and the pressure plate 12 lies below the mouth thereof, ready to be rotated and driven up through the body of the lard to the dotted position. It will be observed the key 24 connects the screw 21 with the pressure plate shaft 16, and at the same time holds the valve rod in position to close the air vent in the axis of the pressure plate. The crank 39 may then be turned to drive the screw and thus elevate the pressure plate through the lard; during this operation the pawl 42 is riding freely over the ratchet wheel 43, and the spiral conveyer 15 is idle. When the pressure plate has reached the inner side of the bottom of the can, all the lard has passed below said plate. The key 24 is then withdrawn and the screw 21 and shaft 16 are disconnected, also the valve rod is released and the air vent in the axis of the pressure plate is opened. The machine is then ready to dispense the commodity which takes place by reversing the operation of the crank 39 which drives the spiral conveyer 15 and the screw 21. The screw 21 draws down the apertured head 19 and the pressure plate 12 through the connection of the tubular shaft 16. Owing to the peculiar connection between the apertured head 19 and the screw 21, the said head is not rotated, but is moved downwardly under the downward and rotary movement of said screw. The extent of movement thus imparted to the pressure plate depends upon the amount of lard to be dispensed, and this is ascertained from the computing dial 58. It will be understood that the conveyer housing 4 and the discharge spout 5 up to the mouth thereof is always filled with lard, but this lard so remaining in the machine is thoroughly protected from contamination with dust or surrounding atmosphere and is preserved in a most sanitary manner.

I claim:

1. In a dispensing machine, means for holding the receptacle containing the article to be dispensed in an inverted position, a conveyer below said receptacle when so supported, delivery means adapted to be placed within the receptacle and above the article to be dispensed, and actuating means for lowering said delivery means to feed the contents of the receptacle to said conveyer, and for simultaneously rotating the conveyer.

2. In a dispensing machine, means for holding the receptacle containing the article to be dispensed in an inverted position, a conveyer below said receptacle when so supported, a feeding device having means whereby it is adapted to deliver the article to be dispensed from said receptacle to said conveyer, means for imparting a combined rotary and elevating movement to said feeding device to move it to a position from whence to begin the feeding operation, and said last named means also adapted to simultaneously rotate the conveyer and impart a non-rotary downward movement of the feeding device to feed the article to the conveyer.

3. In a dispensing machine, a housing having means for supporting a receptacle containing the article to be dispensed, a conveyer within said housing and below said receptacle, a feed device having means whereby it is adapted to penetrate the body of the article to be dispensed to a point above said body, means for simultaneously elevating and rotating said device to so move it to such point, said last named means also adapted to simultaneously rotate the conveyer, and to impart a non-rotary downward movement to the feed device to feed the article to the conveyer, a delivery cap to receive the article from the conveyer and said housing also acting as a passage way from the conveyer to the cap.

4. In a dispensing machine, means for holding a receptacle containing the article to be dispensed in an inverted position, a conveyer below said receptacle when so supported, a feed plate having means whereby it is adapted to discharge the article to said conveyer from said receptacle, means for imparting to said feed plate a combined rotary and upward movement and a non-rotary downward movement, said last named movement being the movement in which the article is fed to the conveyer.

5. In a dispensing machine, a housing for holding a receptacle containing the article to be dispensed in an inverted position, a conveyer arranged below said receptacle when so supported and receiving the article therefrom, and a plate for exerting downward pressure on the upper surface of the said article to feed it to the conveyer, and means for exerting such pressure on such plate.

6. In a dispensing machine, means for holding a receptacle containing the article to be dispensed in an inverted position, a conveyer below said receptacle when so supported, a pressure plate having means whereby it is adapted to be elevated and rotated through the article within said receptacle and to move said article below it in the combined rotation and elevation thereof, means for imparting such combined movement to said plate, and said last named means also imparting a non-rotary downward movement to said plate in feeding the material to the conveyer, said means also imparting simultaneous movement to the conveyer to deliver the article from the machine.

7. In a dispensing machine, means for holding a receptacle containing the article to be dispensed in an inverted position, a conveyer arranged to receive the article from said receptacle when so supported, a delivery cap to receive the article from said conveyer, said first named means also acting as a passage way for the article from the conveyer to the cap, computing devices operating in connection with said delivery cap to ascertain the weight and value of the quantities of the article received by said cap, and means for exerting downward pressure on the top of the article within the receptacle to feed it to the conveyer.

8. In a machine for dispensing lard, means for supporting the receptacle containing the lard, a conveyer to receive the lard from said receptacle, a pressure plate provided with a shaft, said plate being so constructed that when rotated in one direction it tends to advance through the lard, a screw, means adapted to connect said screw and the shaft of the pressure plate to impart a combined rotary and upward movement to the pressure plate, and means for imparting the rotary movement, said means being adapted to also rotate the conveyer when the direction of rotation of the screw is reversed, and whereby when the screw and shaft are disconnected the pressure plate is caused to deliver lard from the receptacle to the conveyer by a downward non-rotary movement.

9. In a machine for dispensing lard, a housing terminating in a discharge spout and having means for supporting a receptacle containing the article to be dispensed, a delivery cap pivoted to said spout, computing devices coöperating with said cap to ascertain the weight and value of each quantity of lard delivered to said cap, a conveyer mounted below said receptacle and adapted to deliver the lard to said cap, a pressure plate movable in said receptacle to a position above the lard and from which position it is adapted to feed the lard to the conveyer, means for moving said pressure plate to such position, comprising a shaft attached to said plate, an apertured head fixed to said shaft, a screw having a loose connection with said head, and a key adapted to interlock said screw and shaft.

10. In a machine for dispensing lard and the like, means for holding the can containing the article in an inverted position, a pressure plate, a shaft connected thereto, said plate having an opening therein through which the lard may pass when said plate is simultaneously rotated and elevated through the material within the can, a driving screw attached to said shaft, whereby said screw and said shaft are adapted to move in unison longitudinally, clutch mechanism whereby said screw and shaft are adapted to rotate in unison, and means for actuating said screw to lower the plate without rotating it.

11. A machine for dispensing lard from the cans in which it is packed, comprising a conveyer housing having means for supporting the can containing the lard in an inverted position, a conveyer within said housing, a pressure plate, means whereby said pressure plate is adapted to be given a combined upward rotary movement through the lard within the can, and a non-rotary downward movement to feed the lard in a body to the conveyer, and valvular means for permitting the external air to relieve the vacuum or partial vacuum between said pressure plate and the bottom of the can.

12. In a machine for dispensing lard, a pressure plate having an orifice therein, a tubular shaft to which said plate is attached, a rod within said shaft coöperating with the orifice in said plate, a driving screw adapted to be connected to said tubular shaft, means for effecting such connection and for elevating the rod within said tubular shaft.

13. In a machine of the type specified, a pressure plate adapted to receive an upward rotary movement, and a downward non-rotary movement, a shaft connected to said plate, a driving screw, means for connecting said shaft and screw, whereby said plate may be given an upward rotary movement when the shaft and screw are connected, and a downward non-rotary movement when the shaft and screw are disconnected, and means for driving said screw.

14. In a machine for dispensing lard from cans in which it is packed, the combination with a conveyer, and means for supporting a can of lard above said conveyer, of a plate adapted to be placed between the lard and the bottom of the can to discharge the lard to the conveyer, a delivery cap to receive the lard from the conveyer, said supporting means serving as a passage way from the conveyer to the cap, and computing devices actuated by the force of the lard entering said cap to ascertain the quantity and value of the lard discharged to said cap.

15. In a machine for dispensing lard from the cans in which it is packed, a conveyer, a pressure plate having means whereby it is adapted to be placed between the lard and the bottom of the can to feed the lard to the conveyer, a shaft attached to said plate, an apertured head rigidly attached to said shaft, a driving screw having a swiveled connection with said head, means for driving said screw in opposite directions, and a clutch for connecting the screw and the shaft so that the pressure plate may be rotated and elevated by said screw in one of its movements and lowered by said screw in the other of its movements.

16. In a machine for dispensing lard from the cans in which it is packed, a conveyer, a delivery plate adapted to be placed between the lard and the bottom of the can, means for so placing said plate, and for simultaneously lowering said plate to feed the lard to the conveyer and operating the conveyer, and a delivery cap to receive the lard from the conveyer and a housing forming a passageway leading from the conveyer to the cap.

17. In a machine for dispensing lard from the cans in which it is packed, a conveyer, a delivery device having an opening therein adapted to be placed between the lard and the bottom of the can, means for simultaneously actuating said conveyer and lowering said delivery device to force the lard to the conveyer, a delivery cap to receive the lard from the conveyer, said cap being adapted to indicate the quantity and value of the lard delivered thereto, a housing forming a passageway leading from the conveyer to the cap and means for elevating said cap when the same is being returned to its normal position.

18. In a machine for dispensing lard, means for holding the receptacle containing the lard, a conveyer arranged to receive the lard from said receptacle when so held, means for feeding the lard from the receptacle to the conveyer, means for indicating the weight and value of quantities of lard delivered by said conveyer, means for discharging said quantities from the machine, and valvular means whereby the atmosphere is permitted to destroy the vacuum formed in the receptacle due to the removal of the lard therefrom.

19. In a machine for dispensing lard from receptacles, a feed plate, means for operating said feed plate to remove the lard from said receptacles, means for indicating the quantity of lard removed from said receptacles, means for conveying the lard to the indicating means as said lard is removed by the feed plate, and means whereby the atmosphere is permitted to destroy the vacuum formed in the receptacles due to the removal of the lard therefrom.

In testimony whereof I affix my signature in presence of two witnesses.

WILLIAM R. MITTENDORF.

Witnesses:
 C. M. THEOBALD,
 MATTHEW SIEBLER.